US010829637B2

(12) United States Patent
Ariura et al.

(10) Patent No.: US 10,829,637 B2
(45) Date of Patent: Nov. 10, 2020

(54) THERMOPLASTIC COMPOSITION MADE OF POLYPHENYLENE SULPHIDE AND POLYAMIDE-GRAFTED POLYOLEFIN

(71) Applicant: ARKEMA FRANCE, Colombes (FR)

(72) Inventors: Fumi Ariura, Kawasaki (JP); Mathieu Sabard, Serquigny (FR); Dominique Jousset, Bougival (FR)

(73) Assignee: ARKEMA FRANCE, Colombes (FR)

( * ) Notice: Subject to any disclaimer, the term of this patent is extended or adjusted under 35 U.S.C. 154(b) by 81 days.

(21) Appl. No.: 15/532,616

(22) PCT Filed: Nov. 24, 2015

(86) PCT No.: PCT/FR2015/053184
§ 371 (c)(1),
(2) Date: Jun. 2, 2017

(87) PCT Pub. No.: WO2016/087746
PCT Pub. Date: Jun. 9, 2016

(65) Prior Publication Data
US 2017/0342270 A1 Nov. 30, 2017

(30) Foreign Application Priority Data

Dec. 3, 2014 (FR) ..................... 14 61842

(51) Int. Cl.
*C08L 81/02* (2006.01)
*B32B 27/32* (2006.01)
*B32B 27/34* (2006.01)
*C08G 75/02* (2016.01)
*B32B 27/28* (2006.01)
*B32B 27/00* (2006.01)
*B32B 27/06* (2006.01)
*B32B 27/08* (2006.01)
*C08L 51/06* (2006.01)
*C08G 69/48* (2006.01)
*C08G 81/02* (2006.01)

(52) U.S. Cl.
CPC ............. *C08L 81/02* (2013.01); *B32B 27/00* (2013.01); *B32B 27/06* (2013.01); *B32B 27/08* (2013.01); *B32B 27/28* (2013.01); *B32B 27/32* (2013.01); *B32B 27/34* (2013.01); *C08G 75/02* (2013.01); *C08L 51/06* (2013.01); *B32B 2405/00* (2013.01); *C08G 69/48* (2013.01); *C08G 81/028* (2013.01)

(58) Field of Classification Search
CPC ......... C08L 81/02; C08L 51/06; C08G 69/48; C08G 75/02; C08G 81/028; B32B 27/00; B32B 27/06; B32B 27/08; B32B 27/32; B32B 27/34; B32B 2405/00
See application file for complete search history.

(56) References Cited

U.S. PATENT DOCUMENTS

| 3,963,799 A | 6/1976 | Starkweather, Jr. |
| 3,976,720 A | 8/1976 | Hammer et al. |
| 5,342,886 A | 8/1994 | Glotin et al. |
| 5,759,925 A * | 6/1998 | Ballard ..................... D01F 6/90 428/373 |
| 2003/0199635 A1 | 10/2003 | Court et al. |
| 2005/0119396 A1* | 6/2005 | Papke ....................... C08K 7/14 524/494 |
| 2009/0253836 A1 | 10/2009 | Flat et al. |
| 2010/0099817 A1 | 4/2010 | Bizet et al. |
| 2013/0261244 A1 | 10/2013 | Jousset et al. |
| 2015/0333205 A1* | 11/2015 | Jousset ................. C08F 255/02 136/259 |

FOREIGN PATENT DOCUMENTS

| EP | 2 196 489 A1 | 6/2010 |
| FR | 2 291 225 A1 | 6/1976 |
| FR | 2 912 150 A1 | 8/2008 |
| FR | 2 918 150 A1 | 1/2009 |
| JP | H0711130 A | 1/1995 |
| JP | 2000508720 A | 7/2000 |
| JP | 2004059757 A | 2/2004 |
| JP | 2004510865 A | 4/2004 |
| JP | 2005035576 A | 2/2005 |
| JP | 2006299216 A | 11/2006 |
| JP | 2009538954 A | 11/2009 |
| JP | 2013542293 A | 11/2013 |
| WO | WO 02/28959 A1 | 4/2002 |
| WO | WO 2012/040591 A2 | 3/2012 |
| WO | WO 2013/160620 A1 | 10/2013 |
| WO | WO-2013160620 A1 * | 10/2013 ............ C08F 255/02 |

OTHER PUBLICATIONS

International Search Report (PCT/ISA/210) dated Feb. 22, 2016, by the European Patent Office as the International Searching Authority for International Application No. PCT/FR2015/053184.
Written Opinion (PCT/ISA/237) dated Feb. 22, 2016, by the European Patent Office as the International Searching Authority for International Application No. PCT/FR2015/053184.
Office Action (Notice of Reasons for Rejection) dated May 8, 2018, by the Japanese Patent Office in corresponding Japanese Patent Application No. 2017-529744, and an English Translation of the Office Action. (12 pages).

(Continued)

Primary Examiner — James C Goloboy
(74) Attorney, Agent, or Firm — Buchanan Ingersoll & Rooney P.C.

(57) ABSTRACT

The present invention relates to a composition that comprises a mixture of polymers, which comprises: a first polymer comprising polyphenylene sulphide, making up 55 wt % to 95 wt % of the mixture; a thermoplastic modifier, making up 5 wt % to 45 wt % of the mixture; optionally one or more functional additives, making up at most 10 wt % of the mixture, preferably at most 5 wt % of the mixture, characterised in that the thermoplastic modifier includes a second polymer which comprises a polyolefin backbone containing a group of at least one unsaturated monomer (X) and a plurality of polyamide grafts. The invention also relates to a multilayer structure including a plurality of adjacent layers, at least one of which consists of the aforementioned composition.

12 Claims, No Drawings

(56) References Cited

OTHER PUBLICATIONS

Office Action (Notice of Reasons for Rejection) dated Jan. 4, 2019 by the Japanese Patent Office in corresponding Japanese Patent Application No. 2017-529744, and an English Translation of the Office Action. (9 pages).

Office Action (The Second Office Action) dated Feb. 7, 2020, by the China National Intellectual Property Aministration in corresponding Chinese Patent Application No. 201580073042.0, English Translation only. (8 pages).

* cited by examiner

THERMOPLASTIC COMPOSITION MADE OF POLYPHENYLENE SULPHIDE AND POLYAMIDE-GRAFTED POLYOLEFIN

FIELD OF THE INVENTION

The invention relates to a thermoplastic composition made of polyphenylene sulfide, also called PPS. More specifically, the thermoplastic composition according to the invention is presented in the form of a mixture essentially made of PPS and of an optionally nanostructured polymer, more specifically a polyamide-grafted polyolefin of a particular type.

The invention also relates to a multilayer structure in which at least one of the layers consists the composition according to the invention.

STATE OF THE ART

Polyphenylene sulfide, or PPS, is a well known resin in the automotive field because this thermoplastic presents several interesting properties including high flexural modulus, high melting temperature, high heat resistance and barrier properties for gasoline and fuels that make it particularly suited to making tubing or cables for automobiles and vehicles generally.

Plasticizers and polymeric modifiers have often been used to improve the qualities of PPS or more precisely give them properties that complement some applications.

Nevertheless, the plasticizers, such as alkyl phthalates or phosphates, migrate over time to the surface of the PPS thermoplastic composition (a phenomenon known as bleeding), which has the consequence of changing the mechanical properties and also the appearance of the thermoplastic mixture or finished product.

Secondly, the polymer modifiers used currently, such as functionalized polyolefins (i.e. having chemically reactive groups or functions), lead to increased melt viscosity and/or undesirable gelling problems (entirely crosslinked polymer network).

Thus, current research seeks a polymeric modifier that can significantly improve the properties of PPS resins, without degrading their qualities or interfering with the preparation/manufacturing process.

From document WO 02/28959 a polyamide block grafted copolymer on a polyolefin backbone is known currently, which copolymer is chosen from among ethylene/maleic anhydride and ethylene/alkyl (meth)acrylate/maleic anhydride copolymers, forming a co-continuous alloy preferably with a nanostructure; this gives this terpolymer/copolymer exceptional thermomechanical properties, which are maintained by redispersing this grafted copolymer in flexible polyolefins such as flexible ethylene polymers.

Nevertheless, such a polymer consisting of a polyolefin including a plurality of polyamide grafts is not a functionalized polyolefin (grafts are already present on the main chain, which means that its compatibility with PPS is particularly uncertain. In addition, the abovementioned grafted polyamide polymer is nanostructured, which could cause a high additional risk.

Also known are document WO 2013/160620, which discloses a functionalized polyolefin, document U.S. Pat. No. 5,759,925, which discloses a PPS resin, and document WO 2012/040591, which discloses polyolefin-PPS mixtures but the invention that the present invention relates to uses a rather specific type of polyamide-grafted polyolefin.

BRIEF DESCRIPTION OF THE INVENTION

It has been observed by the applicant after diverse experiments and tests, that, by contrast with the teaching well known to the person skilled in the art, a specific mixture of PPS with the abovementioned polyamide-grafted polyolefin can produce a thermoplastic composition presenting much better ductility, much better creep strength and in finally better processability, all while retaining the initial PPS qualities.

Accordingly, the present invention relates to a thermoplastic composition consisting of a mixture of polymers, consisting of:
  a first polymer consisting of polyphenylene sulfide, present between 55% and 95% by weight of the mixture,
  a thermoplastic modifier, present between 5% and 45% by weight of the mixture,
  optionally one or more functional adjuvants, present at most at 10% by weight of the mixture, preferably at most at 5% by weight of the mixture,
characterized in that the thermoplastic modifier comprises a second polymer consisting of a polyolefin backbone containing at least one unsaturated monomer (X) and a plurality of polyamide grafts, where the polyamide grafts are attached to the polyolefin backbone by the residue of the unsaturated monomer (X) comprising a function that can react by a condensation reaction with a polyamide having at least one amine end and/or at least one carboxylic acid end, the residue of the unsaturated monomer (X) is bound to the backbone by grafting or copolymerization.

Other advantageous features of the invention are specified in what follows:
  preferably, the thermoplastic modifier further comprises a third polymer consisting of one or more polyolefins, preferably including at least one functionalized polyolefin presenting at least one epoxy and/or maleic anhydride function,
  advantageously, the second and third polymers are each present in the thermoplastic modifier between 5% and 95%, ideally between 20 and 80%, preferably between 40% and 60% by weight of said thermoplastic modifier (where the sum of these two polymers constitutes 100% of the thermoplastic modifier).
  according to a preferred possibility proposed by the invention, the composition according to the invention provides that the thermoplastic modifier consists of the second and third abovementioned polymers,
  advantageously, the thermoplastic modifier represents from 5% to 45%, preferably between 10% and 30%, by weight of the abovementioned mixture.
  according to a particularly interesting feature of the invention, the abovementioned grafted polymer, i.e. the abovementioned second polymer, is nanostructured.
  preferably, regarding the second polymer, the number average molar weight of the abovementioned polyamide grafts of the abovementioned grafted polymer is comprised in the range ranging from 1000 to 10,000 g/mol, preferably comprised between 1000 and 5000 g/mol.
  preferably, regarding the second polymer, the polyamide grafts comprise at least one copolyamide, for example 6/12 mono $NH_2$, and/or a monofunctional $NH_2$ polyamide 6 and/or a monofunctional $NH_2$ polyamide 11.

preferably, the functional adjuvant consists of one or more plasticizers, adhesion promoters, UV stabilizers and/or UV absorbers, antioxidants, flame retardants, colorants/optical brighteners, pigments and strengthening fillers.

The invention also relates to a multilayer structure, such as in particular a coating for a cable or a tube, including a plurality of adjacent layers, characterized in that at least one of these layers consists of the composition as defined above.

It must be noted that the composition according to the invention is presented in connection with the application to a tube, tubing or analog but of course this thermoplastic composition could be envisaged for all other applications where such a composition is advantageously usable, in particular in multilayer structures such as for example cables (in particular tubes for transporting air or fluid), shoes (for example in the field of skiing), one or more of the layers of a photovoltaic module, adhesive films or coatings.

DETAILED DESCRIPTION OF THE INVENTION

The first polymer consists of a polyphenylene sulfide, or PPS. This polymer, which appeared on the market in the 70 s, is well known to the person skilled in the art. PPS is generally prepared by nucleophilic coupling, the polycondensation of p-dichlorobenzene with sodium sulfide, in aprotic solvents such as N-methyl-2-pyrrolidone.

The second polymer is described in detail in particular in the abovementioned document WO 02/28959.

The polyolefin backbone of the second polyamide-grafted polymer is a polymer comprising an α-olefin as monomer.

α-Olefins having from 2 to 30 carbon atoms are preferred.

As α-olefin, mention may be made of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene, and 1-triacontene.

Mention may also be made of cyclo-olefins having from 3 to 30 carbon atoms, preferentially from 3 to 20 carbon atoms, such as cyclopentane, cycloheptene, norbornene, 5-methyl-2-norbomene, tetracyclododecene, and 2-methyl-1,4,5,8-dimethano-2,3,4,4a,5,8,8a-ocetahydronaphthalene; di and polylefins, such as butadiene, isoprene, 4-methyl-1, 3-pentadiene, 1,4-pentadiene, 1,5-hexadiene, 1,3-hexadiene, 1,3-octadiene, 1,4-octadiene, 1,5-octadiene, 1,6-octadiene, ethylidenenorbomene, vinyl norbornene, dicyclopentadiene, 7-methyl-1,6-octadiene, 4-ethylidiene-8-methyl-1,7-nonadiene, and 5,9-dimethyl-1,4,8-decatriene; aromatic vinyl compounds such as mono- or poly alkylstyrenes (comprising styrene, o-methylstyrene, m-methylstyrene, p-methylstyrene, o,p-dimethylstyrene, o-ethylstyrene, m-ethylstyrene and p-ethylstyrene), and the derivatives comprising functional groups such as monoxystyrene, ethoxystyrene, vinyl benzoic acid, vinyl methyl benzoate, vinyl benzyl acetate, hydroxystyrene, o-chlorostyrene, p-chlorostyrene, di-vinyl benzene, 3-phenylpropene, 4-phenylpropene, α-methylstyrene, vinyl chloride, 1,2-difluoroethylene, 1,2-dichloroethylene, tetrafluoroethylene, and 3,3,3-trifluoro-1-propene.

In the scope of the present invention, the term α-olefin also comprises styrene. Propylene and especially ethylene are preferred as α-olefin.

This polyolefin may be a homopolymer when a single α-olefin is polymerized in the polymer chain. As examples, mention may be made of polyethylene (PE) or polypropylene (PP).

This polyolefin may also be a copolymer when at least two comonomers are copolymerized in the polymer chain, one of the two comonomers called the "first comonomer" being an α-olefin and the other comonomer, called "second comonomer," is a monomer that can polymerize with the first monomer.

As second comonomer, mention may be made of:
one of the α-olefins already cited, which is different from the first α-olefin comonomer,
dienes such as for example 1,4-hexadiene, ethylidene norbornene, butadiene,
esters of unsaturated carboxylic acid such as for example alkyl acrylates or alkyl methacrylates gathered under the term alkyl (meth)acrylates. The alkyl chains of these (meth)acrylates may have up to 30 carbon atoms. As alkyl chains, mention may be made of methyl, ethyl, propyl n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, hencosyl, docosyl, tricosyl, tetracosyl, pentacosyl, hexacosyl, heptacosyl, octacosyl, nonacosyl. Methyl, ethyl and butyl (meth)acrylates are preferred as unsaturated carboxylic acid esters,
the vinyl esters of carboxylic acids. As examples of vinyl carboxylic acid esters, mention may be made of vinyl acetate, vinyl versatate, vinyl propionate, vinyl butyrate, or vinyl maleate. Vinyl acetate is preferred as vinyl carboxylic acid ester.

Advantageously, the polyolefin backbone comprises at least 50 mol % of the first comonomer; its density may be advantageously comprised between 0.91 and 0.96.

The preferred polyolefin backbones consist of one ethylene-alkyl (meth)acrylate copolymer. By using this polyolefin backbone, excellent behavior is obtained over time in light and at temperature.

It would not fall outside the scope of the invention if different "second comonomers" were copolymerized in the polyolefin backbone.

According to the present invention, the polyolefin backbone contains at least one unsaturated monomer residue (X) that can react on an acid function and/or polyamide graft amine by a condensation reaction. According to the definition of the invention, the unsaturated monomer (X) is not a "second comonomer."

As unsaturated monomer (X) comprised on the polyolefin backbone, mention may be made of:
unsaturated epoxides. Among these are for example aliphatic glycidyl esters and ethers such as allylglycidylether, vinylglycidylether, glycidyl maleate and itaconate, glycidyl acrylate and methacrylate. These are also for example alicyclic glycidyl esters and ethers such as 2-cyclohexene-1-glycidylether, cyclohexene-4,5-diglycidylcarboxylate, cyclohexene-4-glycidyl carboxylate, 5-norbornene-2-methyl-2-glycidyl carboxylate and endocis-bicyclo(2,2,1)-5-heptene-2,3-diglycidyl dicarboxylate. Glycidyl methacrylate is preferred for use as unsaturated epoxide.
unsaturated carboxylic acids and salts thereof, for example acrylic acid or methacrylic acid and the salts of these same acids.
carboxylic acid anhydrides. They may be chosen from for example maleic, itaconic, citraconic, allylsuccinic, cyclohex-4-ene-1,2-dicarboxylic, 4-methylenecyclohex-4-ene-1,2-dicarboxylic, bicyclo(2,2,1)hept-5-ene-2,3-dicarboxylic, and x-methylbicyclo(2,2,1)hept-5- ene-2,2-dicarboxylic anhydrides. Maleic anhydride is the preferred carboxylic acid anhydride.

The unsaturated monomer (X) is preferably an unsaturated carboxylic acid anhydride.

According to an advantageous version of the invention, the preferred number of unsaturated monomers (X) bound on average on the polyolefin backbone is greater than or equal to 1.3 and/or preferentially less than or equal to 20.

Accordingly, if (X) is maleic anhydride and the number average molar weight of the polyolefin is 15,000 g/mol, it was found that this corresponded to a proportion of anhydride of at least 0.8% by weight of the whole polyolefin backbone and at most 6.5%. These values associated with the mass of polyamide grafts determine the proportion of polyamide and backbone in the polyamide-grafted polymer.

The polyolefin backbone containing the unsaturated monomer residue (X) is obtained by polymerization of monomers (first comonomer, optional second comonomer, and optionally unsaturated monomer (X)). This polymerization may occur via a high pressure free-radical process or a solution process, in an autoclave or tubular reactor, these processes and reactors being well known to the person skilled in the art. When the unsaturated monomer (X) is not copolymerized in the polyolefin backbone, it is grafted on the polyolefin backbone. Grafting is also a known operation. The composition would comply with the invention if several different functional monomers (X) were copolymerized and/or grafted on the polyolefin backbone.

Depending on the types and ratio of monomers, the polyolefin backbone may be semi-crystalline or amorphous. For amorphous polyolefins, only the glass transition temperature is observed, while for semi-crystalline polyolefins a glass transition temperature and a melting temperature (which by definition is greater) are observed. The person skilled in the art will simply select ratios for monomers and molecular weights for the polyolefin backbone to be able to easily obtain the desired glass transition temperature and optionally melting temperature and viscosity values for the polyolefin backbone.

In a preferred manner, the polyolefin has a Melt Flow Index (MFI) comprised between 0.5 and 400 g/10 min (190° C.; 2.16 kg, ASTM D 1238).

The polyamide grafts may be either homopolyamides or copolyamides.

The expression "polyamide grafts" targets in particular the aliphatic homopolyamides that result from the polycondensation of:
 a lactam,
 or an aliphatic alpha, omega-aminocarboxylic acid,
 or an aliphatic diamine and an aliphatic diacid.

As examples of lactam, mention may be made of caprolactam, oenantholactam and lauryllactam.

As examples of aliphatic alpha, omega-aminocarboxylic acid, mention may be made of aminocaproic acid, amino-7-heptanoic acid, amino-11-undecanoic acid and amino-12-dodecanoic acid.

As examples of aliphatic diamine, mention may be made of hexa-methylenediamine, dodecamethylenediamine and trimethylhexamethylene diamine.

As examples of aliphatic diacid, mention may be made of adipic, azelaic, suberic, sebacic and dodecanedicarboxylic acids.

Among aliphatic homopolyamides, mention may be made, as examples and in a non-limiting manner, of the following polyamides: polycapralactam (PA6); polyundecanamide (PA11, sold by Arkema under the tradename Rilsan®); polylauryllactam (PA12, also sold by Arkema under the tradename Rilsan®); polybutylene adipamide (PA4.6); polyhexamethylene; adipamide (PA6.6); polyhexamethylene azelamide (PA6.9); polyhexamethylene sebacamide (PA-6.10); polyhexamethylene dodecanamide (PA6.12); polydecamethylene dodecanamide (PA 10.12); polydecamethylene sebacanamide (PA10.10) and polydodecamethylene dodecanamide (PA12.12).

The expression "semi-crystalline polyamides" also targets cycloaliphatic homopolyamides.

Mention may in particular be made of cycloaliphatic homopolyamides that result from the condensation of a cycloaliphatic diamine and an aliphatic diacid.

As examples of cycloaliphatic diamine, mention may be made of 4,4'-methylene-bis(cyclohexylamine), also called para-bis(aminocyclo-hexyl)methane or PACM, 2,2'-dimethyl-4,4'methylene-bis(cyclo-hexyl-amine), also called bis-(3-methyl-4-aminocyclohexyl)-methane or BMACM.

Accordingly, among cycloaliphatic homopolyamides, mention may be made of polyamides PACM.12, resulting from the condensation of PACM with the C12 diacid, BMACM.10 and BMACM.12 resulting from the condensation of BMACM with, respectively, C10 and C12 aliphatic diacids.

The expression "polyamide grafts" also targets semi-aromatic homopolyamides that result from the condensation of:
 an aliphatic diamine and an aromatic diacid, such as terephthalic acid (T) and isophthalic acid (I). The polyamides obtained are then commonly called "polyphthalamides" or PPAs;
 an aromatic diamine, such as xylylenediamine, and more particularly metaxylylenediamine (MXD) and an aliphatic diacid.

Accordingly, and in a non-limiting manner, mention may be made of polyamides 6.T, 6.I, MXD.6 and also MXD.10.

The polyamide grafts that come into play in the composition according to the invention may also be copolyamides. These result from the polycondensation of at least two of the groups of monomers set out above to produce homopolyamides. The term "monomer" in the present description of copolyamides must be taken in the sense of a "repetitive unit." Indeed, the case where a repetitive unit of PA consists of the combination of a diacid with a diamine is unusual. It is considered that it is the combination of a diamine and a diacid, i.e. the diamine-diacid pair (in equimolar quantities), that corresponds to the monomer. This is explained by the fact that individually, the diacid or diamine is only a structural unit, which does not suffice alone for polymerization to give a polyamide.

Accordingly, copolyamides cover in particular the condensation products of:
 at least two lactams,
 at least two aliphatic alpha, omega-aminocarboxylic acids,
 at least one lactam and at least one aliphatic alpha, omega-aminocarboxylic acid,
 at least two diamines and at least two diacids,
 at least one lactam with at least one diamine and at least one diacid,
 at least one alpha, omega-aminocarboxylic aliphatic acid with at least one diamine and at least one diacid,
where the diamine(s) and diacid(s) may be, independently of each other, aliphatic, cycloaliphatic or aromatic.

Depending on the types and ratio of monomers, the copolyamides may be semi-crystalline or amorphous. For amorphous copolyamides, only the glass transition temperature is observed, while for semi-crystalline copolyamides a glass transition temperature and a melting temperature (which by definition is greater) are observed.

Among amorphous copolyamides that can be used in the scope of the invention, mention may be made of for example copolyamides containing semi-aromatic monomers.

Among copolyamides, semi-crystalline copolyamides may also be used and particularly those like PA 6/11, PA6/12 and PA6/11/12.

The degree of polymerization may vary widely, depending on whether its value is a polyamide or a polyamide oligomer.

Advantageously, the polyamide grafts are monofunctional.

For the polyamide graft to have a monoamine end group, using a chain limiter having the following formula is sufficient:

wherein:
R1 is hydrogen or a linear or branched alkyl group containing up to 20 carbon atoms,
R2 is a group having up to 20 linear or branched alkyl, or alkenyl carbon atoms, a saturated or unsaturated cycloaliphatic substituent, an aromatic substituent or a combination of these. The limiter may be, for example, laurylamine or oleylamine.

For the polyamide graft to have a mono carboxylic acid end group, using a chain limiter having the formula R'1—COOH, R'1—CO—O—CO—R'2 or a dicarboxylic acid is sufficient:

R'1 and R'2 are linear or branched alkyl groups containing up to 20 carbon atoms.

Advantageously, the polyamide graft has and end with an amine function. The preferred monofunctional polymerization are laurylamine and oleylamine.

The polyamide grafts have a molar mass comprised between 1000 and 10,000 g/mol, preferably comprised between 1000 and 5000 g/mol.

Polycondensation may be used to graft polyamide grafts and is done using the typical known processes, for example at a temperature generally comprised between 200 and 300° C., under vacuum or an inert atmosphere, with stirring in the reaction mixture. The average chain length of the graft is determined by the initial molar ratio between the polycondensable monomer or the lactam and the monofunctional polymerization limiter. To calculate the average chain length, typically a chain limiting molecule is counted for one graft chain.

The person skilled in the art will simply select types and ratio for monomers and molar weights for the polyamide grafts to be able to easily obtain the desired glass transition temperature and optionally melting temperature and viscosity values for the polyamide graft.

The condensation reaction of the polyamide graft on the polyolefin backbone containing the residue of X (or the functionalized monomer for the second grafted copolymer, i.e. the elastomer copolymer) is conducted by reaction of an amine or acid function on the polyamide graft on the residue of X. Advantageously, monoamine polyamide grafts are used and amide or imide bonds are created by reacting the amine function onto the function of the residue of X.

This condensation is preferably conducted on a melt. To make the composition according to the invention, conventional mixing and/or extrusion techniques can be used. The components of the composition are therefore mixed to form a compound that could optionally be granulated when it leaves the nozzle. Advantageously, coupling agents are added during compounding.

Accordingly, to obtain a nanostructured composition, the polyamide graft and the backbone can be mixed in an extruder, at a temperature generally comprised between 200 and 300° C. The average time for the molten material to be in the extruder may be comprised between 5 seconds and 5 minutes, and preferably between 20 seconds and 1 minute. The yield of this condensation reaction is evaluated by selective extraction of free polyamide grafts, i.e. those that did not react to form the polyamide-grafted polymer.

The preparation of polyamide grafts with amine ends and their addition onto a polyolefin backbone containing the residue of (X) or onto a functionalized monomer (second copolymer) is described in patents U.S. Pat. Nos. 3,976,720, 3,963,799, 5,342,886 and FR2291225. Though this particularity is not essential for the present invention, the polyamide-grafted polymer of the present invention advantageously has a nanostructured organization.

The optional third polymer consists of one or more polyolefins, optionally or preferably functionalized, in other words a mixture of polyolefins, optionally one of which is a functionalized polyolefin.

Advantageously, the functionalized polyolefin comprises at least one functional group of the maleic anhydride or epoxy type. It could be Lotader® or an Orevac®, sold by the applicant. It should also be ethylene elastomers like Tafmer® MH5020 sold by the company Mitsui Chemicals, like Exxelor VA1801, VA1803 sold by the company Exxon Mobil Chemical, or like Fusabond® N493 sold by the company Dupont.

Regarding the optional functional adjuvant, it may be present in the composition at a maximum of 10% by weight of the composition and will be chosen in a limiting way from among the compounds mentioned below or a mixture of these compounds.

Plasticizers could be added to the composition according to the invention to facilitate use and improve productivity of the manufacturing process of the composition and the structures. Mention may be made as examples of aromatic or naphthalenic paraffin mineral oils, which also improve the adhesive power of the composition according to the invention. As plasticizer, mention may also be made of phthalates, azelates, adipates, and ticresyl phosphate.

In the same manner, adhesion promoters, although not necessary, may be advantageously added to improve the adhesive power of the composition when that must be particularly high. The adhesion promoter is a non-polymer ingredient; it may be organic, crystalline, inorganic and more preferentially semi-inorganic, semi-organic. Among these, mention may be made of organic titanates or silanes, such as for example monoalkyl titanates, trichlorosilanes and trialkoxysilanes, trialcooxysilane. It can also be provided that these adhesion promoters are directly grafted onto the first or the second copolymer by a technique well known to the person skilled in the art, for example via reactive extrusion.

Since UV radiation can cause slight yellowing in thermoplastic compositions, UV stabilizers and UV absorbers (these compounds generally being called anti-UV agents) such as benzotriazole, benzophenone and other hindered amines, may be added to some applications where such a phenomenon must be avoided. These compounds may for example contain benzophenone or benzotriazole. They can be added in quantities below 10% by mass of the total mass of the composition and preferentially of 0.1 to 2%.

Antioxidants can also be added to limit yellowing during production of the composition, such as phosphorus-containing compounds (phosphonites and/or phosphites) and hindered phenols. These antioxidants can be added in quantities below 10% by mass of the total mass of the composition and preferentially of 0.05 to 2%.

In the same manner, in some applications, flame retardants may also be added to the composition according to the invention. These agents can be halogenated or non-halogenated. Among halogenated agents, mention may be made of brominated products. As non-halogenated agent, phosphorus-based additives such as ammonium polyphosphate, aluminum phosphinates and phosphonates, melamine cyanurate, pentaerythritol, zeolites and mixtures of these agents may be used. The composition may comprise these agents in proportions ranging from 1 to 10% relative to the total mass of the composition. Colorants or optical brighteners may also be added.

Pigments can also be added to the composition, such as for example titanium dioxide or zinc oxide in proportions generally ranging from 1 to 10% relative to the total mass of the composition.

Strengthening fillers can also be added to the composition, such as talc, glass fibers, carbon fibers, montmorillonites, carbon nanotubes, carbon black, in proportions generally ranging from 0.1% to 10% relative to the total mass of the composition.

Preparation of the Composition According to the Invention

As has been mentioned previously, the technique of grafting polyamide grafts on the polyolefin backbone to obtain the polyamide-grafted polyolefin according to the invention is well known to the person skilled in the art, and in particular from the documents cited previously FR 2912150, FR 2918150 or EP 21966489.

PPS, the functional adjuvant (the additive cited above) and the functionalized polyolefin are all perfectly well known to the person skilled in the art, as is how to make them. The mixing process for these compounds is completely conventional and does not require any specific explanation for the person skilled in the art.

Therefore if crosslinking agents are added the scope of the invention is not exceeded. As examples, mention may be made of organic isocyanates or peroxides. This crosslinking may also be achieved using known irradiation techniques. This crosslinking may be conducted by one of many methods known to the person skilled in the art, in particular by using thermally activated initiators, for example peroxide and azo compounds, pbotoinitiators such as benzophenone, by radiation techniques including light radiation, UV radiation, electron beams and X-rays, silanes bearing reactive functions such as an amino silane, an epoxy silane, a vinyl silane such as for example tri-ethoxy or tri-methoxy vinyl silane, and wet crosslinking. The manual called "Handbook of Polymer Foams and Technology" above, on pages 198 to 204, provides extra teaching to which the person skilled in the art may refer.

Materials Used to Form the Tested Formulations

Lotader® AX8840: ethylene and glycidyl methacrylate copolymer (8% by weight) produced by Arkema having an MFI (190° C. with 2.16 kg measured according to ISO 1133) of 5 g/10 min.

Lotader® AX8900: ethylene, methyl acrylate (24% by weight) and glycidyl methacrylate (8% by weight) terpolymer produced by Arkema having an MFI (190° C. with 2.16 kg measured according to ISO 1133) of 6 g/10 min.

Lotader® 4210: ethylene, butyl acrylate (6.5% by weight) and maleic anhydride (3.6% by weight) terpolymer produced by Arkema having an MFI of (190° C. with 2.16 kg measured according to ISO 1133) of 6 g/10 min.

Fusabond N493: maleic anhydride (MAH)-grafted ethylene-octene copolymer sold by Dupont, with density 0.87 g/cm$^3$ and MFI 1.6 g/10 mm (190° C. with 2.16 kg measured according to ISO 1133).

PPS: polyphenylene sulfide from the company DIC.

Apolhya® LP3: The Apolhya family® is a polymer family sold by Arkema that combines the properties of polyamides with those of polyolefins due to producing co-continuous morphologies on a manometric scale. This grade is characterized by a MFI (Melt Flow Index) of 1.0 gram/10 minutes at 230° C. with 2.16 kg and a melting temperature of 220° C.

Obtaining Test Formulations and Films

The formulations were prepared by compounding using a co-rotating twin-screw extruder like the TEX30 X® with screw length L=1365 mm (millimeter) and a ratio L/D=45.5 D (where D is the screw diameter) whose sheath elements are heated along a flat profile at 310° C., the rotation rate is 240 rpm (revolutions per minute) with a flow rate of 15 kg/h (kilogram per hour).

Compositions of 200-μm (micrometer) monolayer films were made using flat film extrusion on an extruder having screw diameter of 20 mm for L/D=25. The sheath elements are heated along a flat profile at 300° C.

The prepared compositions are presented, below:

Composition No. 1: the thermoplastic composition comprises only the abovementioned PPS, Composition No. 2: the thermoplastic composition comprises 80% by weight of PPS and 20% by weight of a mixture of functional polyolefin (mixture of Lotader® AX8840 and Lotader® AX8900 (mass ratio 50/50)), Composition No. 3: the thermoplastic composition comprises 80% by weight of PPS and 20% by weight of Apolhya, Composition No. 4: the thermoplastic composition comprises 80% by weight of PPS and 20% by weight of a mixture (~50%-50%) of functional polyolefin (mixture of Lotader® AX8840 and Lotader® AX8900 (mass ratio 50/50)) (~10% by weight of the composition) and Apolhya (~10% by weight of the composition), Composition No. 5: the thermoplastic composition comprises 60% by weight of PPS and 40% by weight of a mixture (~75%-25%) of functional polyolefin (mixture of Lotader® AX8840 and Lotader® AX8900 (mass ratio 50/50)) (~30% by weight of the composition) and Apolhya (~10% by weight of the composition), Composition No. 6: the thermoplastic composition comprises 60% by weight of PPS and 40% by weight of a mixture (~25%-75%) of functional polyolefin (mixture of Lotader® AX8840 and Lotader® AX8900 (mass ratio 50/50) (~10% by weight of the composition) and Apolhya (~30% by weight of the composition), Composition No. 7: the thermoplastic composition comprises 90% by weight of PPS and 10% by weight of a mixture (~50%-50%) of functional polyolefin (mixture of Lotader® AX8840 and Lotader® AX8900 (mass ratio 50/50)) (~5% by weight of the composition) and Apolhya (~5% by weight of the composition), Composition No. 8: the thermoplastic composition comprises 55% by weight of PPS and 45% by weight of a mixture (~89%-11%) of functional polyolefin (mixture of Lotader® AX8840 and Lotader® AX8900 (mass ratio 50/50)) (~40% by weight of the composition) and Apolhya (~5% by weight of the composition), Composition No. 9: the thermoplastic composition comprises 55% by weight of PPS and 45% by weight of a mixture (~11%-89%) of functional polyolefin (mixture of Lotader® AX8840 and Lotader® AX8900 (mass ratio 50/50) (~5% by weight of the composition) and Apolhya (~40% by weight of the composition), Composition No. 10: the thermoplastic composition comprises 80% by weight of PPS and 20% by weight of a mixture (~50%-50%) of functional polyolefin (mixture of Lotader® AX8840 and Lotader® 4210 (mass ratio 50/50)) (~10% by weight of the composition) and Apolhya (~10% by weight of the composition), Composition No. 11: the thermoplastic composition comprises 80% by weight of PPS and 20% by weight of a mixture (~50%-50%) of Fusabond N493 (~10% by weight of the composition) and Apolhya (~10% by weight of the composition), Tests Conducted on the Films Three types of tests were conducted on compositions 1 to 11 to test whether the abovementioned technical problems were solved but it must be noted that the compositions according to the invention do moreover present other particularly interesting properties, namely that they approximately satisfy the same qualities as PPS alone (composition No. 1).

These three tests consist firstly of evaluating the mechanical properties of different formulations according to standard ISO 527 1A (tensile modulus expressed in MegaPascal (MPa), lengthening and stress) at ambient temperature, and secondly, in determining the creep properties (following residual deformation after mechanical stress at different temperatures), and finally to evaluate the ductility of formulations through the Charpy impact test at ambient temperature (according to standard ISO 179-1eA).

Tensile Test

The tensile modulus and lengthening and stresses are measured according to standard ISO 527 1A. In advance, the various samples of the different formulations were conditioned according to the following conditions: 15 days at 23° C. at 50% humidity.

Creep Test

Creep resistance is evaluated from test pieces cut from films (dimensions: 1 cm×5 cm×0.2 mm). A weight is applied to the end of the sample corresponding to a stress of 0.5 bars i.e. 0.05 MPa. The stress is applied for several minutes at different temperatures: 100° C., 120° C. and 180° C. for each of the compositions. The residual deformation is measured after return to room temperature.

Charpy Impact Test

Charpy impact tests were conducted on injected bars with a V-notch (radius at the notch base of 0.25 mm), at ambient temperature according to ISO 527 1eA.

The results of the various tests conducted on each of the compositions first clearly show the technical advantages of the composition according to the invention, although the compositions are not in any way predictable, and secondly the preferred domains (mass %) for this composition.

| | Tension modulus | Break on lengthening % | Stress at break MPa | Lengthening (%) during a creep test | | | V-notch (ISO 179) resilience (kJ/m$^2$) |
|---|---|---|---|---|---|---|---|
| PPS alone | 2620 MPa | 4 | 86 | 100° C. 80% 10 min Time before break 17 min | 120° C. break Time before break 20 s | 180° C. break Instant break | resilience (kJ/m$^2$) 23° C. 3 kJ/m$^2$ |
| 80% PPS + 20% FPO (*) | 1950 MPa | 50 | 37 | 100° C. 110% 10 min Time before break 15 min | 120° C. — Time before break 15 s | 180° C. — Instant break | 23° C. 62 kJ/m$^2$ |
| 80% PPS + 20% LP3 | 2000 MPa | 54 | 36 | 100° C. 30% 10 min 55% 20 min Break > 25 min | 120° C. — 170% (5 min) Break > 10 min | 180° C. — 90% (1 min) Break > 3 | resilience (kJ/m$^2$) 23° C. 61 kJ/m$^2$ |
| 80% PPS + 20% FPO*/LP3 (10/10) | 1970 MPa | 51 | 39 | 100° C. 40% 10 min 66% 20 min Break > 20 min | 120° C. — 200% (5 min) Break > 7 min | 180° C. — 50% (1 min) Break > 3 min | resilience (kJ/m$^2$) 23° C. 59 kJ/m$^2$ |
| 60% PPS + 40% FPO*/LP3 (30/10) | 1100 MPa | 62 | 26 | 100° C. 100% 10 min 180% 20 min Break > 20 min | 120° C. — 180% (3 min) Time before break 5 min | 180° C. — — Instant break | resilience (kJ/m$^2$) 23° C. 63 kJ/m$^2$ |
| 60% PPS + FPO*/LP3 (10/30) | 1190 MPa | 71 | 27 | 100° C. 80% 10 min 160% 20 min Break > 20 min | 120° C. — 130% (3 min) Break > 6 min | 180° C. — 170% (2 min) Break > 3 min | resilience (kJ/m$^2$) 23° C. 58 kJ/m$^2$ |
| 90% PPS + 10% FPO*/LP3 (5/5) | 2280 MPa | 11 | 68 | 100° C. 80% 10 min Break > 15 min | 120° C. — 200% (2 min) Break after 3 min | 180° C. — 150% (1 min) Break after 2 min | resilience (kJ/m$^2$) 23° C. 27 kJ/m$^2$ |

-continued

|  | Tension modulus | Break on lengthening % | Stress at break MPa | Lengthening (%) during a creep test | | | V-notch (ISO 179) resilience (kJ/m²) |
|---|---|---|---|---|---|---|---|
| 55% PPS + 45% FPO*/LP3 (40/5) | 980 MPa | 78 | 21 | 100° C. 120% 10 min 220% 13 min Break > 16 min | 120° C. — 200% (3 min) Break 5 min | 180° C. — Instant break | resilience (kJ/m²) 23° C. 92 kJ/m² |
| 80% PPS + 20% FPO**/LP3 (10/10) | 1960 MPa | 50 | 39 | 100° C. 30% 10 min 60% 20 min Break > 20 min | 120° C. — 180% (5 min) Break > 10 min | 180° C. — 50% (1 min) Break > 3 min | resilience (kJ/m²) 23° C. 55 kJ/m² |
| 80% PPS + 20% Fusabond ® N493/LP3 (10/10) | 1920 MPa | 62 | 33 | 100° C. 40% 10 min 70% 20 min Break > 20 min | 120° C. — 220% (5 min) Break > 6 min | 180° C. — 70% (1 min) Break > 3 min | resilience (kJ/m²) 23° C. 70 kJ/m² |

*Mixture of Lotader AX8840 and Lotader AX8900 (mass ratio 50/50).
**Mixture of Lotader AX8840 and Lotader 4210 (mass ratio 50/50).
FPO: Functional polyolefin/PL3: Apolhya ® LP3

The invention claimed is:

1. A thermoplastic composition consisting of a mixture of polymers, consisting of:
    a first polymer consisting of polyphenylene sulfide, present between 55% and 95% by weight of the mixture;
    a thermoplastic modifier, present between 5% and 45% by weight of the mixture; and
    optionally one or more functional adjuvants, present at most at 10% by weight of the mixture,
wherein the thermoplastic modifier comprises a second polymer consisting of a polyolefin backbone containing at least one unsaturated monomer (X) and a plurality of polyamide grafts, wherein the polyamide grafts are attached to the polyolefin backbone by the residue of the unsaturated monomer (X) comprising a function that can react by a condensation reaction with a polyamide having at least one amine end and/or at least one carboxylic acid end, the residue of the unsaturated monomer (X) is bound to the backbone by grafting or copolymerization.

2. The composition of claim 1, wherein the thermoplastic modifier further comprises a third polymer consisting of one or more polyolefins.

3. The composition of claim 2, wherein the second and third polymers are each present in the thermoplastic modifier between 5% and 95% by weight of said thermoplastic modifier, and wherein the sum of the second and third polymers constitutes 100% of the thermoplastic modifier.

4. The composition of claim 2, wherein the thermoplastic modifier consists of the second and third polymers.

5. The composition of claim 1, wherein the thermoplastic modifier represents from between 10% and 30% by weight of the mixture.

6. The composition of claim 1, wherein the grafted polymers nanostructured.

7. The composition of claim 1, wherein the average molar weight of the polyamide grafts of the grafted polymer is in the range from 1000 to 10,000 g/mol.

8. The composition of claim 1, wherein the polyamide grafts comprise at least one copolyamide.

9. The composition of claim 1, wherein the functional adjuvant consists of one or more plasticizers, adhesion promoters, UV stabilizers and/or UV absorbers, antioxidants, flame retardants, colorants/optical brighteners, pigments and strengthening fillers.

10. A multilayer structure including a plurality of adjacent layers, wherein at least one of the plurality of adjacent layers consists of the composition of claim 1.

11. The composition of claim 8, wherein the at least one copolyamide is 6/12 mono $NH_2$, and/or a monofunctional $NH_2$ polyamide 6 and/or a monofunctional $NH_2$ polyamide 11.

12. The multilayer structure of claim 10 in the form of a coating for a cable or a tube.

* * * * *